United States Patent

Lincoln et al.

(10) Patent No.: US 6,840,534 B2
(45) Date of Patent: Jan. 11, 2005

(54) AIRBAG MODULE

(75) Inventors: Paul Lincoln, Nierstein (DE); Thilo Wackenroder, Eppstein (DE); Dirk Weyrauch, Heppenheim (DE); Matthias Volkmann, Kronberg/Ts (DE); Hans-Peter Zirfas, Budenheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 206 days.

(21) Appl. No.: 10/212,783

(22) Filed: Aug. 7, 2002

(65) Prior Publication Data

US 2003/0067144 A1 Apr. 10, 2003

(30) Foreign Application Priority Data

Oct. 4, 2001 (DE) .......................................... 101 48 829

(51) Int. Cl.[7] .............................................. B60R 21/16
(52) U.S. Cl. ..................................... 280/728.2; 280/741
(58) Field of Search ............................. 280/728.2, 736, 280/741, 732

(56) References Cited

U.S. PATENT DOCUMENTS

| 5,342,084 A | * | 8/1994 | Rose et al. ............... 280/728.2 |
| 5,356,175 A | | 10/1994 | Rose et al. ............... 280/728.2 |
| 5,433,472 A | | 7/1995 | Green et al. ............. 280/728.2 |
| 5,456,489 A | | 10/1995 | Rose et al. ............... 280/728.2 |
| 5,458,362 A | | 10/1995 | Buchanan et al. ........ 280/728.2 |
| 5,462,305 A | * | 10/1995 | Hamada ................... 280/728.2 |
| 5,553,886 A | * | 9/1996 | Gunn et al. .............. 280/728.2 |
| 5,577,764 A | * | 11/1996 | Webber et al. ........... 280/728.2 |
| 5,620,200 A | | 4/1997 | Garner et al. ............ 280/728.2 |
| 5,639,112 A | | 6/1997 | Phillion et al. .......... 280/728.2 |
| 5,732,971 A | * | 3/1998 | Lutz ........................ 280/728.2 |
| 5,803,486 A | * | 9/1998 | Spencer et al. .......... 280/728.2 |
| 5,839,751 A | | 11/1998 | Lutz ........................ 280/728.2 |
| 5,947,510 A | * | 9/1999 | Athon et al. ............. 280/728.2 |
| 6,168,185 B1 | | 1/2001 | Ross ........................ 280/728.2 |
| 6,481,742 B2 | * | 11/2002 | Usami et al. ............ 280/728.2 |

FOREIGN PATENT DOCUMENTS

| DE | 19801125 A1 | 7/1999 |
| DE | 19909426 A1 | 5/2000 |

OTHER PUBLICATIONS

XP–000726564, Spacer For Mounting A Shorter Inflator (39913) / Research Disclosure Jul. 1997.

* cited by examiner

Primary Examiner—David R. Dunn
(74) Attorney, Agent, or Firm—Lonnie Drayer

(57) ABSTRACT

An airbag module has at least a housing and an inflator. The inflator is pushed into a securing device on the housing in a longitudinal direction of the inflator. A first longitudinal end of the inflator abuts against an abutment on the housing. A securing element is inserted into the housing behind a second longitudinal end of the inflator and abuts against the second longitudinal end.

17 Claims, 5 Drawing Sheets

AIRBAG MODULE

FIELD OF THE INVENTION

The invention relates to an airbag module and to a method for assembling an airbag module.

BACKGROUND OF THE INVENTION

Side and passenger airbag modules having housings made of synthetic material are known into which an inflator and a folded-together airbag are inserted. The inflator is conventionally secured to the housing by screws or clamps. This requires a large number of individual parts and a complicated procedure for assembling the airbag module.

SUMMARY OF THE INVENTION

With the airbag module according to the present invention, the inflator is secured in the housing by form fit, without additional clamps or screwing elements required to fix the inflator. The inflator is pushed into a securing device and fixed by an additional securing element that is simply pushed into the housing. The securing element is supported against the housing and abuts against the inflator at a longitudinal end thereof. After being pushed in, the securing element prevents the inflator from moving in a longitudinal direction in the securing device. The housing may be made very simply in one piece from synthetic material, since no additional clamps or screwing elements have to be provided. In order to fix the inflator, only a single additional component, namely the securing element, is then required. This simplifies assembly and reduces manufacturing costs.

DETAILED DESCRIPTION OF THE INVENTION

Figure 1:
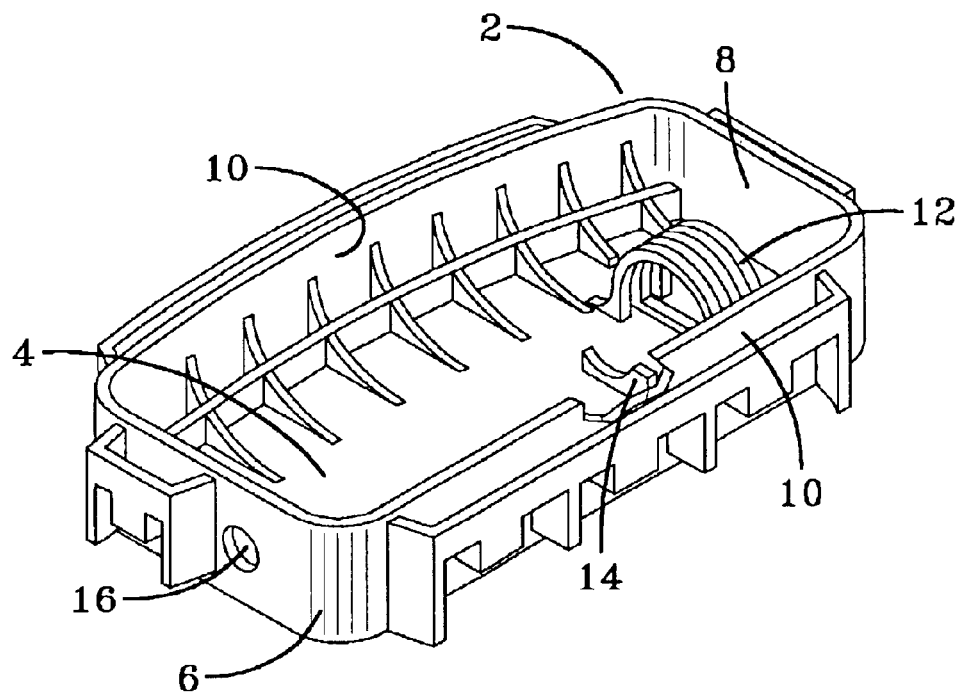
FIG. 1 is a perspective view of a housing for an airbag module according to the present invention.

FIG. 1 shows an airbag housing 2 into which an inflator and an airbag can be inserted. As used herein and in the claims the term "inflator" is understood to refer to a device that provides inflation gas for an airbag, regardless of whether the gas is stored in the inflator, or generated by burning chemicals located in the inflator, or a combination of generating and storing gas in the inflator. The housing is preferably injection molded in one piece from a synthetic material; however, it may also be made in one piece from cast light metal. This further simplifies assembly, since there are no individual parts which have to be put together. The securing device and the housing can, rather, preferably be injection molded from synthetic material in one operational step. The housing has a housing base 4 and two longitudinal sidewalls 10 that are substantially perpendicular to the base and form longitudinal sides of the housing. The two longitudinal sidewalls 10 are connected to one another by the two opposing transverse endwalls 6, 8. Furthermore provided in the housing is a securing clip 12 that extends from the housing base 4. The securing clip 12 defines, together with the housing base 4, an opening that corresponds substantially to the cross-section of a inflator to be inserted. This arrangement makes very simple injection molding of the housing possible without complicated movable cores having to be provided. As a result of this cutout, undercuts in the region of the securing clip are avoided. During the injection molding, part of a mold half may extend through the cutout and thus form a mold for the interior of the securing clip. Despite the cutout, the securing clip forms, together with the regions of the housing base adjacent to the cutout, a closed ring into which the inflator may be inserted. Further provided on the housing base is a support web 14 that can support a inflator. The support element or support web 14 is preferably spaced apart from the securing clip 12. The upper side of the support web 14 and the inside of the securing clip 12, facing the base 4, substantially define the peripheral shape of a inflator to be inserted in the housing. One transverse endwall 6 has an opening 16 therethrough into which a longitudinal end of a inflator can be inserted. The securing clip 12 is spaced apart from the transverse endwall 6 having the opening 16 therethrough, and is closer to the other transverse endwall 8. The support web 14 is arranged between the securing clip 12 and the transverse endwall 6.

Figure 2:
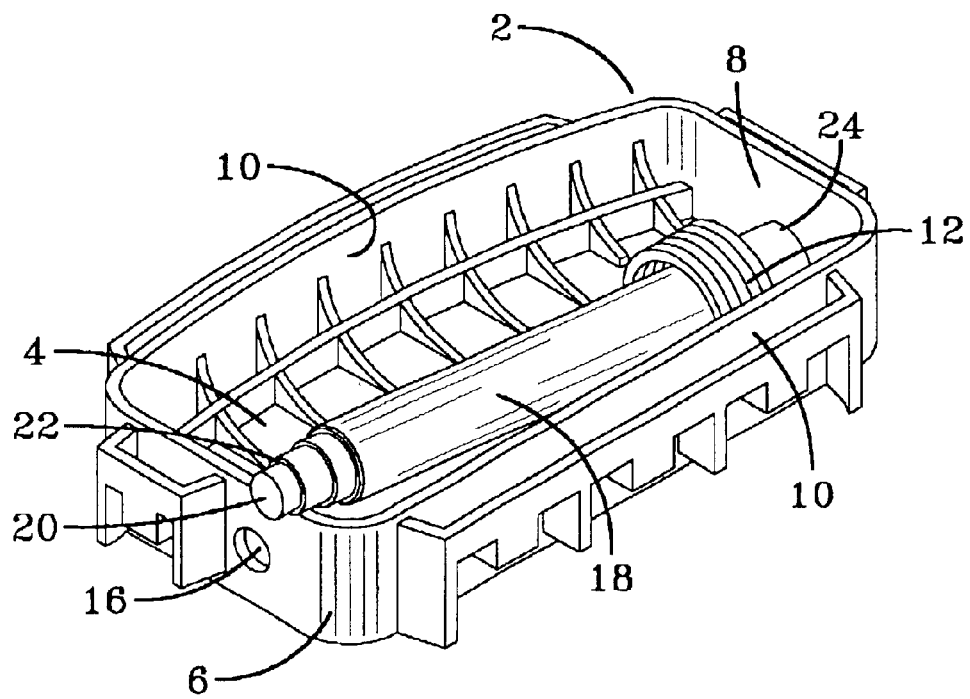
FIG. 2 shows the housing according to FIG. 1, while on inserting an inflator therein.

FIG. 2 shows the airbag housing according to FIG. 1 while an inflator 18 is being inserted into the housing. The inflator 18 tapers at a first longitudinal end 20 so that a shoulder 22 is made there. The tapered longitudinal end 20 of the inflator has a diameter or cross-section that corresponds to the contour of the opening 16 in the transverse endwall 6. When the inflator 18 is inserted into the housing 2, the inflator 18 is first pushed slightly obliquely from above through the open side 2 of the housing and slightly obliquely underneath the securing clip 12. Preferably a portion of the ring formed by the annular clip may be formed by the inside of the housing. This slightly oblique insertion is possible because the spacing between the securing clip 12 and the base 4 of the housing is selected such that it is larger than the extent of the inflator in this direction. The play created in this way corresponds substantially to the thickness of the support web 14. The securing device and preferably the securing clip are preferably constructed such that they surround the inflator without play and fix it in the radial direction. For this purpose, elastic elements such as spring tongues may be provided on the inner periphery of the annular clip. Once pushed underneath the securing clip 12, the inflator 18 is laid or pivoted into the housing 2 such that it lies on the support web 14 (not visible in FIG. 2). In this condition, the inflator 18 is fixed in the radial direction, which is to say transversely with respect to its longitudinal direction, between the securing clip 12 and the support web 14.

Figure 3:
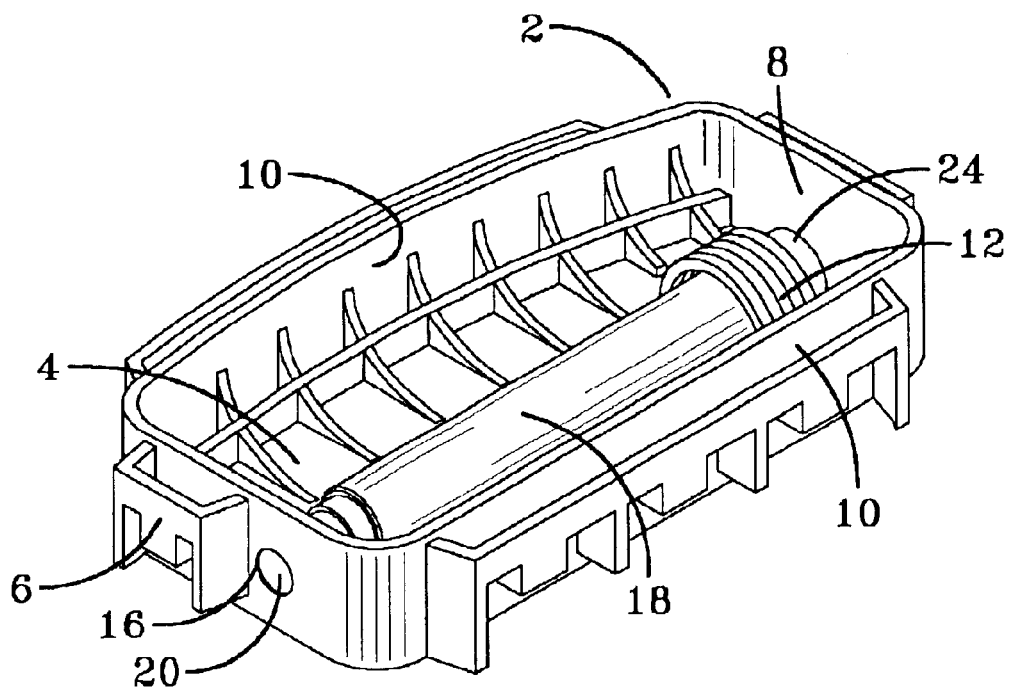
FIG. 3 shows the housing according to FIGS. 1 and 2, with the inflator inserted therein.

In the next step, the inflator 18 is displaced in its longitudinal direction such that the first longitudinal end 20 enters the opening 16 in the transverse endwall 6. At the same time, the shoulder 22 comes to abut the periphery of the opening 16 on the inside of the transverse endwall 6. Furthermore, the inflator 18 is fixed in the opening 16, also in the radial direction, by the tapered longitudinal end 20. This condition is shown in FIG. 3. Here, the tapered first longitudinal end 20 of the inflator is in engagement with the opening 16 in the transverse endwall 6 of the housing 2. Preferably, an electrical connection of the inflator is provided at the first longitudinal end 20. This electrical connection is accessible from the outside the housing through the opening 16, so that, once assembly thereof is complete, the airbag module can easily be connected to the external triggering electronics when installed in a vehicle.

Figure 4:
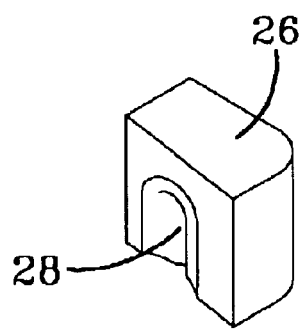
FIG. 4 is a perspective view of a securing element.

FIG. 4 is a perspective view of a securing element 26 that can be inserted into the housing 2 for the purpose of fixing the inflator 18. The securing element 26 is advantageously a form-fitting and/or force-fitting component such as a block or wedge and has on one side an abutment surface 28 that is preferably configured to correspond to the shape of the second longitudinal end 24 of the inflator 18. Such types of fits between two mating parts are commonly referred to as interference fits or friction fits. The abutment surface 28 has a depression or groove which extends in the direction of inserting the securing element 26 and in which the second longitudinal end 24 of the inflator engages. This has the effect of fixing the securing element 26 in the transverse direction, that is to say the direction transverse with respect to the longitudinal direction of the inflator 18, so that it cannot be displaced from the secure position. In the direction in which it is inserted the securing element 26 is preferably fixed by a cover or lid of the housing. The securing element may be made for example of synthetic material. The block may be used to achieve very simple fixing of the inflator in the housing, since the block merely has to be pushed into the housing. For this purpose, advantageously further guide elements may be provided on the housing for precise positioning of the block. A wedge-shaped securing element may additionally be wedged or clamped in to hold the inflator in its longitudinal direction without play.

Figure 5:
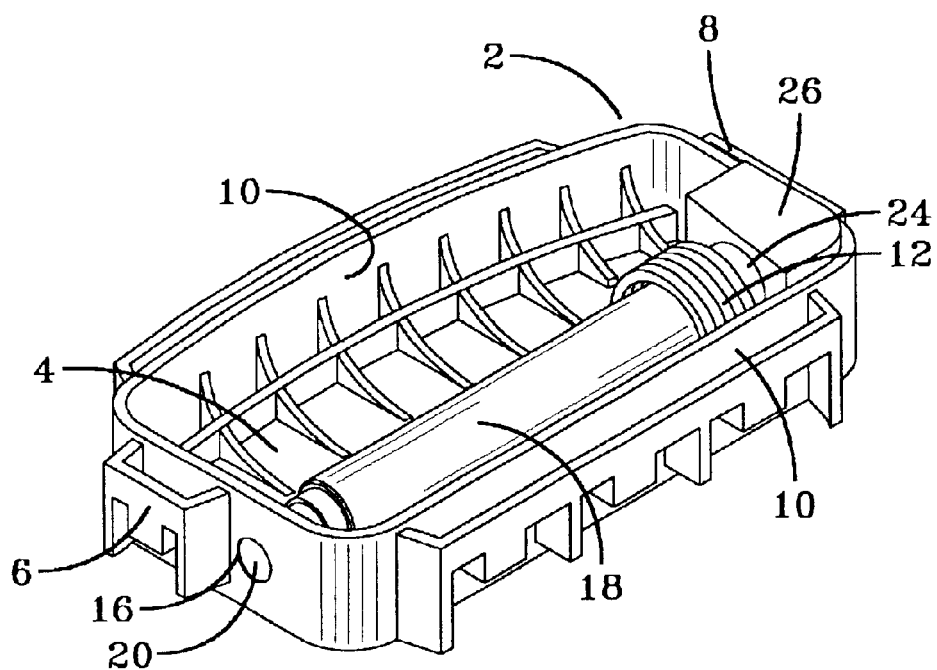
FIG. 5 shows the housing with both the inflator and the securing element inserted therein.

FIG. 5 shows the next step in assembling the airbag module. Here, taking as the basis the condition shown in FIG. 3, the securing element 26 is additionally inserted into the housing 2. The securing element is inserted between the second longitudinal end 24 of the inflator 18 and the inside of the transverse endwall 8 of the housing 2. Here, the abutment surface 28 of the securing element 26 comes into contact with the second longitudinal end 24 of the inflator 18, while the opposing surface of the securing element 26 comes into contact with the inside of the transverse endwall 8 of the housing. In this way, the securing element 26 fills up the space between the transverse endwall 8 and the inflator 18. Because the inflator 18 abuts against the periphery of the opening 16 in the sidewall 6 at its opposing first longitudinal end 20, by the shoulder 22, it is now fixed by the securing element 26 between the two transverse endwalls 6, 8 of the housing 2. Fixing in the radial direction, that is to say transversely with respect to the longitudinal direction between the two longitudinal ends 20, 24 of the inflator 18, is performed by the securing clip 12, the support web 14 and the opening 16.

Figure 6:
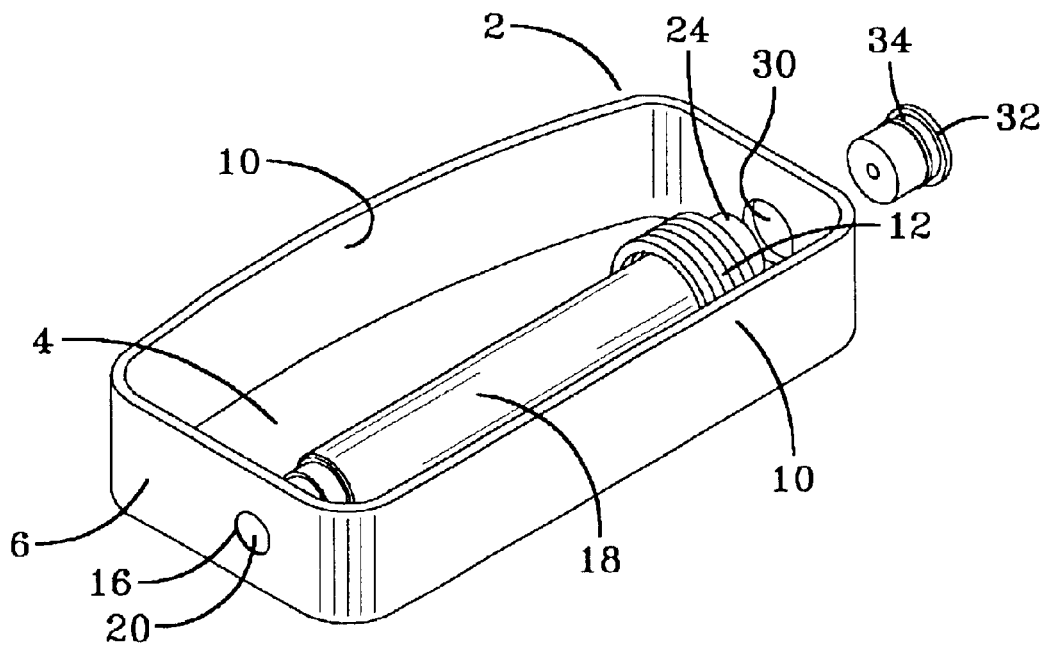
FIG. 6 shows a perspective view of an alternative housing with an inflator inserted therein.

FIG. 6 shows an alternative embodiment of the invention. The arrangement corresponds substantially to the arrangement shown in FIG. 3, and for this reason the same reference numerals have been retained. As an alternative to the arrangement in FIG. 3, an opening 30 is made in the transverse endwall 8, and a securing element in the form of a plug 32 is inserted into the opening 30. In this arrangement, the plug 32 is dimensioned such that in the inserted condition it comes into abutment with the second longitudinal end 24 of the inflator 18. In this way, the inflator is fixed in its longitudinal direction between the transverse endwalls 6, 8 of the housing 2 in a manner similar to the embodiment described with reference to FIG. 5. Peripherally, the plug 32 has a bead 34 with the aid of which it latches onto the transverse endwall 8.

Figure 7:
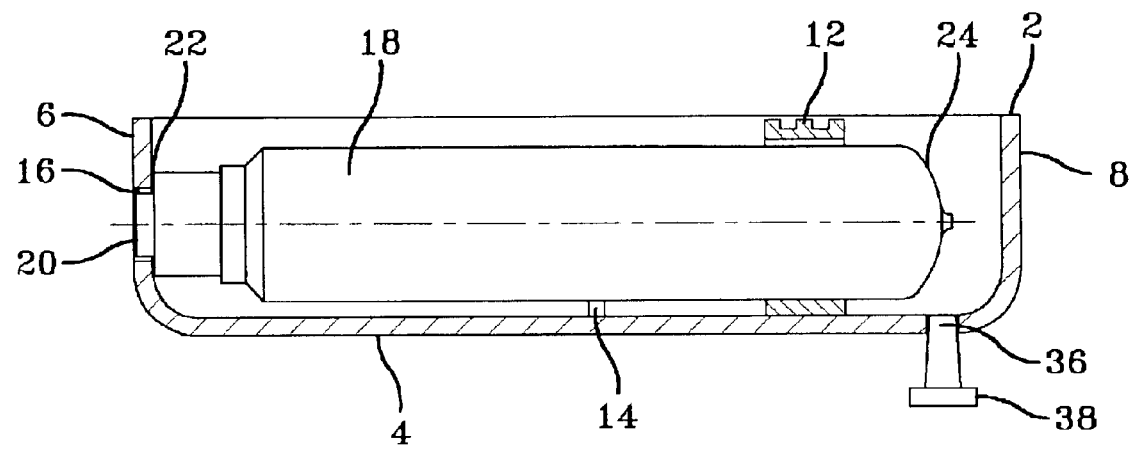
FIG. 7 is a sectional view of an alternative embodiment of the housing with an inflator inserted therein, but before insertion of a securing element.
Figure 8:
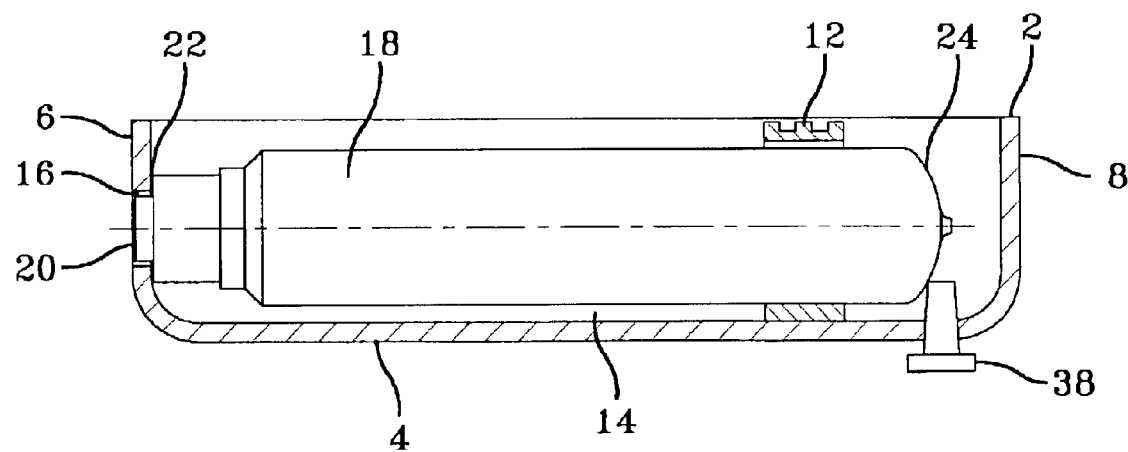
FIG. 8 is a sectional view according to FIG. 7, with the securing element inserted in the housing.

FIG. 7 is a diagrammatic sectional view of a further alternative embodiment. This embodiment also corresponds substantially to the embodiments described previously. It differs only in the shape of the securing element. In FIG. 7, the inflator 18, as shown in FIG. 3, is inserted into the housing 2. At the same time, the inflator 18 is arranged with its first tapered longitudinal end 20 in the opening 16 in the transverse endwall 6 such that the shoulder 22 comes into abutment against the transverse endwall 6. Furthermore, the inflator 18 is additionally secured in the radial direction between the securing clip 12 and the support web 14. Radial securing is ensured at the one end by the opening 16 and at the opposing longitudinal end of the inflator by the securing clip 12 and the support web 14. In this embodiment, the securing element is a pin or plate 38, which may be inserted into an opening 36 in the base 4 of the housing 2. The opening 36 is arranged such that in the inserted condition the pin or plate 38 comes into abutment with the second longitudinal end 24 of the inflator 18. This embodiment has the advantage that the securing element does not have to be stored and handled as a separate component. Rather, it can be made in one piece with the housing and be detached from the housing at the predetermined break point before or when it is inserted into the housing. Alternatively, the securing element can be secured to the housing by a hinge, for example a film hinge, and be pivoted into its final position to fix the inflator. All these embodiments make it possible to make the securing element in one piece with the housing, preferably from synthetic material. Preferably, in the arrangement shown in FIG. 7, the pin 38 is connected to the housing base 4, at its end that is forward in the direction of insertion, by a predetermined break point. This makes it possible to make the pin 38 in one piece with the housing 2. In order to fix the inflator 18 in the housing 2, the pin 38 is pressed into the opening 36 in such a way that it comes into abutment with the second longitudinal end 24 of the inflator 18. Instead of being inserted at the housing base 4, the pin or plate 38 may be inserted into the interior of the housing through one of the sidewalls or a cover to come into abutment with the inflator. The inserted condition of the pin 38 is shown in FIG. 8. Here, the inflator 18 is fixed between the transverse endwall 6 and the pin or plate inserted into the opening in the base 4 of the housing. Radial fixing is performed as explained previously, by the securing clip 12, the support web 14 and the opening 16.

Figure 9:
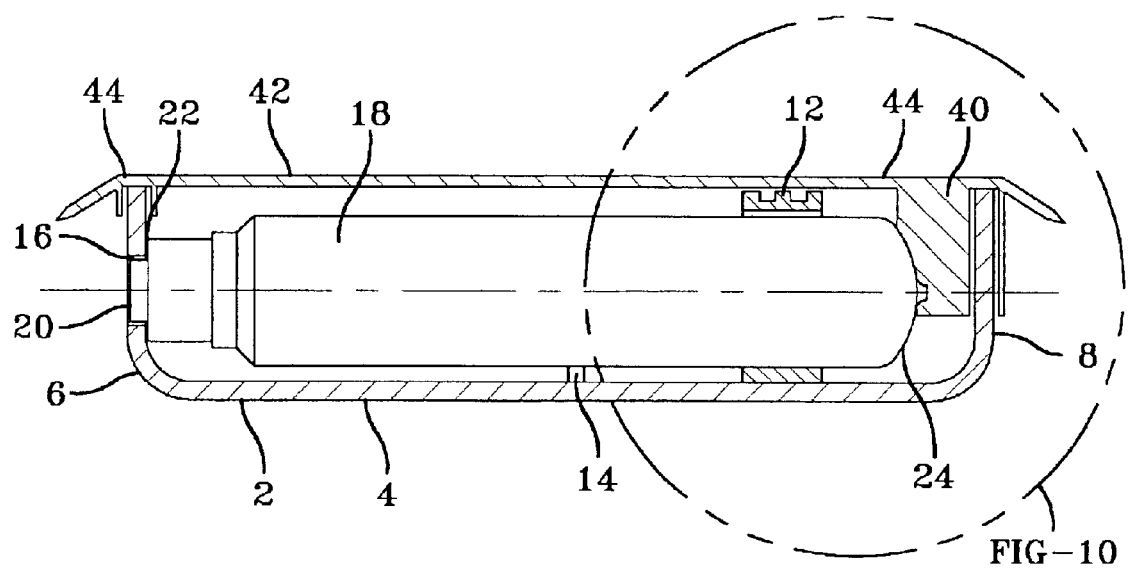
FIG. 9 is a sectional view of an airbag module according to a further embodiment of the invention.

FIG. 9 shows a further alternative embodiment. This embodiment also differs from the previously described embodiments only in the arrangement and shape of the securing element. All the other parts are identical to the elements described previously, and for this reason the same reference numerals have been retained. The arrangement of the inflator 18 in the housing 2 corresponds to the arrangement described with reference to FIG. 7. In the embodiment shown in FIG. 9, the securing element 40 is a projection on a cover 42 of the housing 2 or of the airbag module. The housing preferably has at least one cover 42, and the securing element is a projection 40 on the cover such that the projection juts into the interior of the housing and is in contact with the second longitudinal end of the inflator. An embodiment of this kind makes it possible to assemble the airbag module in a very simple manner. Once the inflator and the folded-together airbag have been inserted into the housing, the cover is placed on the housing. This brings the projection made on the cover into engagement with the second longitudinal end of the inflator, and this secures the latter in the housing. Thus, no additional securing steps for securing the inflator in the housing are required.

Figure 10:
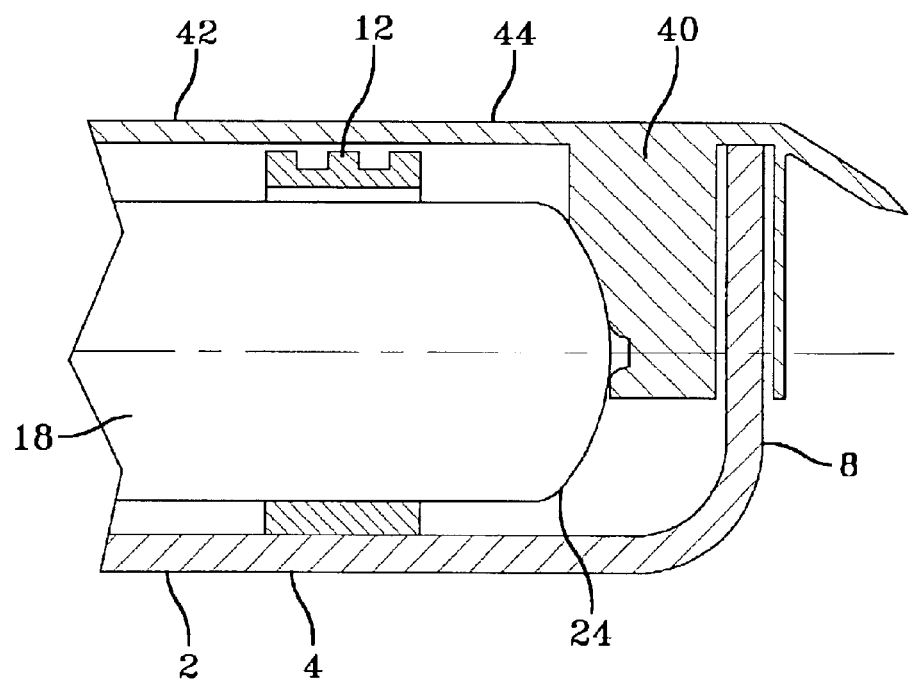
FIG. 10 is an enlarged detail fragmentary view from FIG. 9.

The precise shaping of the securing element 40 according to FIG. 9 is explained with reference to the enlarged detail fragmentary view shown in FIG. 10. The cover 42 closes off from the outside the housing 2 with the inflator 18 and airbag (not shown here) arranged therein. At the same time, the cover 42 closes off the airbag module from the interior of the vehicle and preferably forms part of a vehicle inner fascia. Predetermined break points 44 are provided in the cover 42, and these make it possible for the cover 42 to open so that an airbag (not shown here) can come out. Preferably constructed in one piece with the cover 42 is a securing element in the form of a projection 40. The projection 40 extends from the cover 42 into the interior of the housing 2, so that it comes into abutment with the second longitudinal end 24 of the inflator 18. This fixes the inflator 18 in its longitudinal direction between the transverse or sidewall 6 and the projection 40 on the cover 42. Here too, radial fixing is ensured by the opening 16, the securing clip 12 and the support web 14. The projection 40 is preferably arranged in a region of the cover 42 which is fixedly connected to the housing 2 even when the predetermined break points 44 are broken open and the cover 42 opens. The projection 40 is arranged outside an opening for coming out defined by the predetermined break points 44. It is thus ensured that the inflator 18 continues to be fixed securely in the housing 2 even when the airbag comes out.

While this invention has been described as having a preferred design or construction, the present invention can be further modified within the spirit and scope of this disclosure and knowledge within the art. This application is therefore intended to cover variations, uses, or adaptations of the invention using its general principles. Further, this application is intended to cover such departures from the present disclosure within practice of the art to which this invention pertains and which falls within the bounds of the following claims.

We claim:

1. An airbag module comprising a housing and an inflator, the housing including a housing base, two longitudinal sidewalls, a first longitudinal end, a second longitudinal end, and a securing device extending from the housing base internal of the housing for surrounding an outer periphery of the inflator in the vicinity of the second longitudinal end of the housing in which the inflator is pushed into the securing device in the housing in a longitudinal direction of the inflator, the inflator having a first longitudinal end and a second longitudinal end, with the first longitudinal end of the inflator abutting against an abutment on the housing at the first on longitudinal end of the housing, and a securing element being inserted into the housing between the opposing second longitudinal end of the inflator and the second longitudinal end of the housing abutting against the second longitudinal end of the inflator securing the inflator to the housing.

2. The airbag module according to claim 1 wherein the abutment is a cutout in a housing portion, in which the inflator engages, with the inflator having the region of its first longitudinal end at least one shoulder that abuts against the edge of the cutout and supports the inflator in the longitudinal direction thereof.

3. The airbag module according to claim 1 wherein the securing element is arranged on the housing by a non-detachable hinge, and may be brought into a position in the region of the second longitudinal end of the inflator.

4. The airbag module according to claim 1 wherein the securing element is an interference fitting component.

5. The airbag module according to claim 3 wherein the securing element is an interference fitting component.

6. The airbag module according to claim 1 wherein the securing element is a friction fitting component.

7. The airbag module according to claim 3 wherein the securing element is a friction fitting component.

8. The airbag module according to claim 4 wherein the securing element is a block that fills a free space between the second longitudinal end of the inflator and an opposing housing portion.

9. The airbag module according to claim 5 wherein the securing element is a block that fills a free space between the second longitudinal end of the inflator and an opposing housing portion.

10. The airbag module according to claim 1 wherein the securing element may be inserted into the housing through a cutout such that the securing element comes into contact with the second longitudinal end of the inflator.

11. The airbag module according claim 1 wherein the housing has a cover, and the securing element is a projection on the cover such that the projection juts into the interior of the housing and is in contact with the region of the second longitudinal end of the inflator.

12. The airbag module according to claim 1 wherein the securing device is an annular clip that surrounds the inflator at its outer periphery.

13. The airbag module according to claim 12 wherein the annular clip projects from an inner side of the housing.

14. A method of assembling an airbag module having at least a housing and an inflator, the housing including a housing base, two longitudinal sidewalls, a first longitudinal end, a second longitudinal end, and a securing a device extending from the housing base internal of the housing for surrounding an outer periphery of the inflator in the vicinity of the second longitudinal end of the housing comprising the steps of:

pushing the inflator into a securing device in the housing in a longitudinal direction of the inflator, encircling an outer periphery of the inflator;

bringing a first longitudinal end of the inflator into contact with an abutment on the housing at the first longitudinal end of the housing;

inserting a securing element into the housing between a second, longitudinal end of the inflator; and the second longitudinal end of the housing;

thereby fixing the inflator in both the radial and longitudinal direction with a form fit.

15. The method of assembling an airbag module according to claim 14 wherein the inflator is first pushed into the securing device substantially in its longitudinal direction by its second longitudinal end, then is moved in the opposing direction to bring the first longitudinal end into contact with the abutment, and finally the securing element is inserted between the second longitudinal end of the inflator and the second longitudinal end of the housing.

16. The method of assembling an airbag module according to claim 14 wherein the securing element is connected to the housing in a starting position by a predetermined break point, with the predetermined break point being severed when the securing element is inserted, and the securing element being moved into a second position between the second longitudinal end of the inflator and the second longitudinal end of the housing.

17. The method of assembling an airbag module according to claim 14 wherein the securing element is connected non-detachably to the housing in a starting position, with the securing element being movable into a second position between the second longitudinal end of the inflator and the second longitudinal end of the housing.

* * * * *